United States Patent [19]

Blumberg

[11] 3,841,106
[45] Oct. 15, 1974

[54] PIPELINE ANCHORING SYSTEMS

[76] Inventor: Randolph Blumberg, 5533 Redstart, Houston, Tex. 77035

[22] Filed: Apr. 18, 1973

[21] Appl. No.: 352,357

[52] U.S. Cl. ............................................... 61/72.3
[51] Int. Cl. ............................................. F16l 1/00
[58] Field of Search ............ 61/72.1, 72.3, 72.4, 50; 138/106, 178

[56] References Cited
UNITED STATES PATENTS

| | | | |
|---|---|---|---|
| 2,518,981 | 8/1950 | Edwards | 61/72.3 X |
| 3,014,984 | 12/1961 | Jacobson | 61/72.3 X |
| 3,427,812 | 2/1969 | Hollander | 61/72.3 |
| 3,732,701 | 5/1973 | Lynch | 61/72.4 |
| 3,751,927 | 8/1973 | Perot, Jr. | 61/72.4 |

*Primary Examiner*—Jacob Shapiro

[57] ABSTRACT

Disclosed is a system for securing or anchoring an underwater pipeline to the floor under a body of water. The anchors consist of elongated members having an inverted U-shaped configuration. An underwater sled is disposed over a pipeline and aligned vertically with respect to a boat. Guide cables between the boat and sled permit lowering of an anchor and its embedment into the floor. Upon setting of an anchor, the buoyancy of the sled is increased and the sled is pulled to a new anchoring location by means of cables attached to the forward end of the sled. The cables are disposed over underwater pulleys to anchors at great lengths in front of the sled and attached to winches on the boat. After the sled has been relocated, the boat is relocated to a position of vertical alignment with the sled in its new position and the operation is repeated.

13 Claims, 11 Drawing Figures

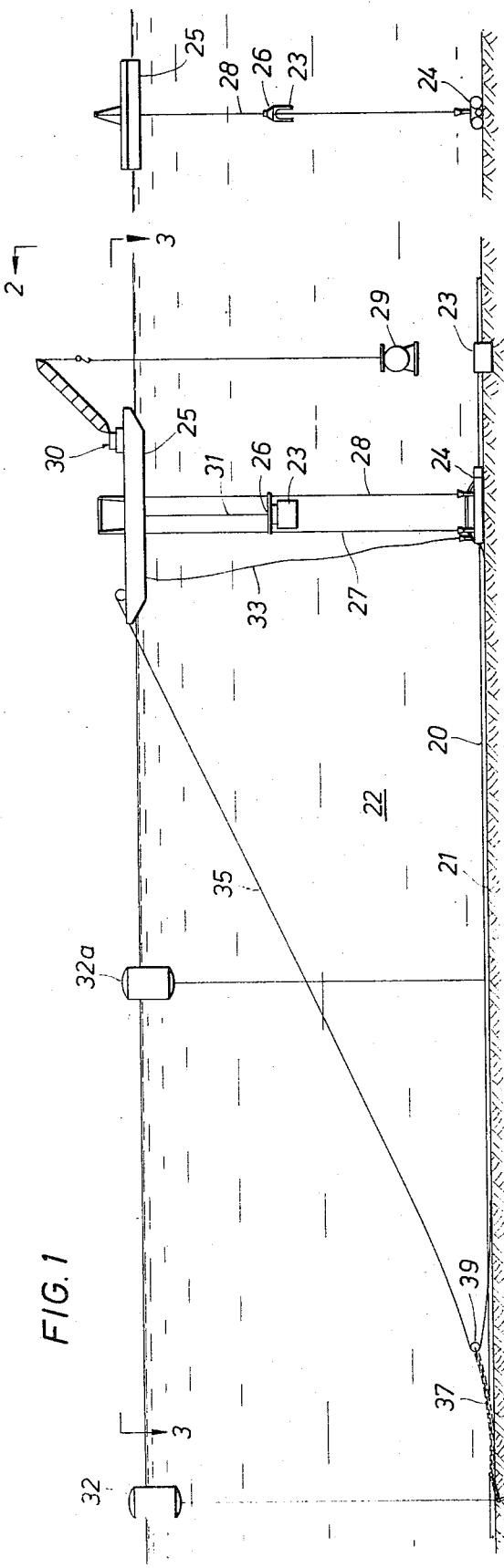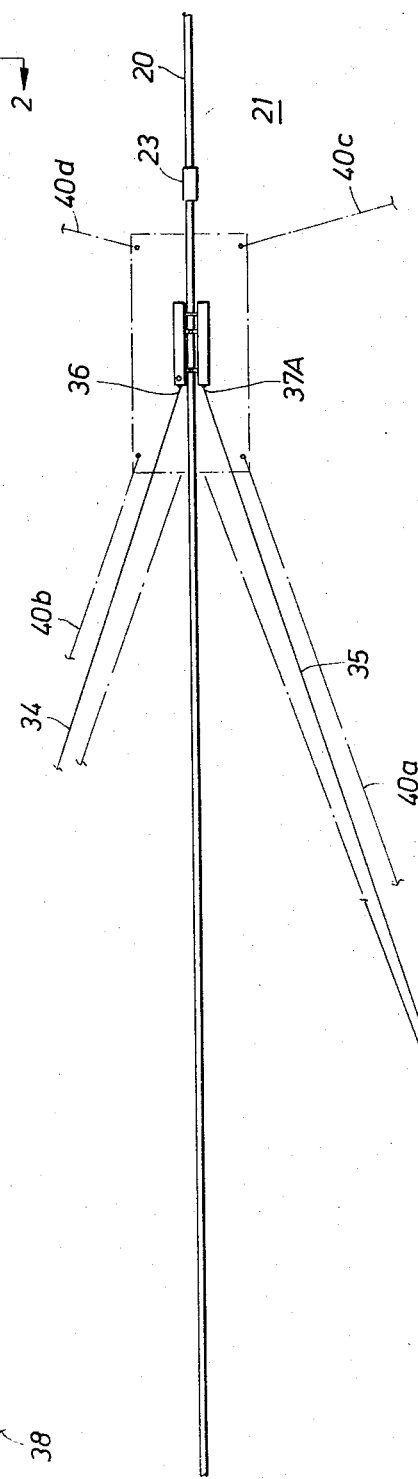

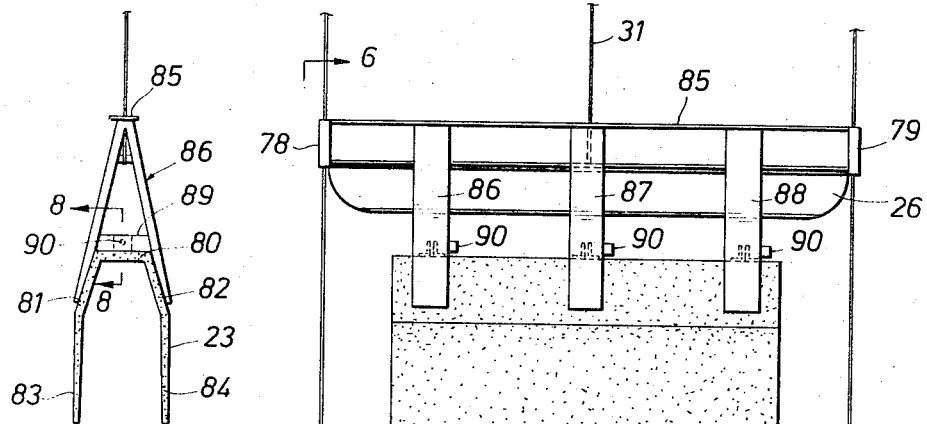
FIG. 6
FIG. 4
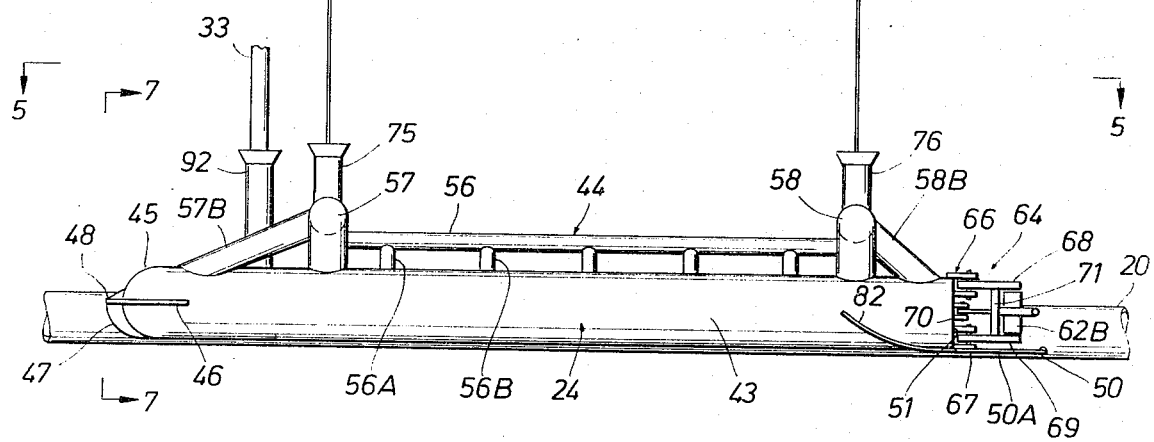
FIG. 5
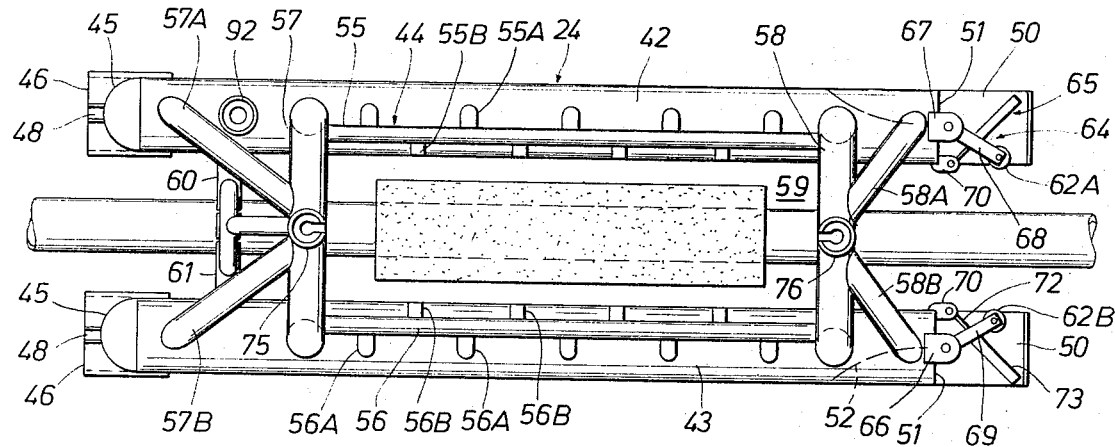

PIPELINE ANCHORING SYSTEMS

BACKGROUND OF THE INVENTION

This invention relates to a system including methods and apparatus for anchoring submerged pipelines in position with respect to the floor of a body of water, and more particularly to a system for attaching a pipeline to the earth's floor with anchors disposed at spaced intervals without normally requiring the services of a diver.

In present techniques for anchoring submerged pipelines to a floor under a body of water, it is customary to employ divers to use manipulating and setting equipment under water. This is not only time consuming, but it is limited in regard to the depth in which a diver can safely and efficiently operate. It is necessary, of course, to have anchoring for underwater pipelines relative to the floor because tides, currents and buoyancy effects can cause a pipeline to shift or move, or even a rupture under some severe conditions encountered underwater. One of the purposes of the present invention is to provide a system whereby a pipeline can be safely and reliably anchored to the floor under a body of water without requiring the need of a diver and utilizing equipment which is positionable from surface located boat means to locate a successive number of anchor members along the length of the pipeline and to insure the proper anchoring of a pipeline on the ocean floor.

SUMMARY OF THE INVENTION

Briefly stated, the present system involves an underwater sled or movable platform which is submergible and received over an underwater pipeline. The sled is adapted to be vertically aligned with respect to a surface boat so that a guiding cable connection between a sled and a boat can permit an anchor to be lowered from the boat into an anchoring position and anchored over a pipeline. When an anchor has been set on the pipeline, a mechanism is operable on the surface boat to displace the sled longitudinally along the pipeline with the sled following the contour of the pipeline until the next operative position where the anchor is desired to be set. At the same time, the boat can be similarly maneuvered by means of the cable system to be located vertically with respect to the sled.

BRIEF DESCRIPTION OF THE DRAWINGS

These and other objects of the present inventions will be better understood when taken in connection with the following drawings in which:

FIG. 1 is an overall diagrammatic view of the system illustrating an anchored work boat on site for setting an anchor on a submerged pipeline;

FIG. 2 is an end view of the system taken along line 2—2 of FIG. 1 and illustrates an anchor partially lowered from the work boat;

FIG. 3 is a top view of the system taken along line 3—3 of FIG. 1 and illustrates the work boat in place with anchor cables extending forward from the port and starboard sides of the work boat;

FIG. 4 is a side view of an anchor guiding means and a pipeline anchor in a position where it is intermediate of the work boat and the pipe anchor sled in position over the pipeline;

FIG. 5 is a top view of the pipe anchor sled taken along line 5—5 of FIG. 4 and illustrating the pipe anchor sled and an anchor positioned over a pipeline;

FIG. 6 is an end view taken along line 6—6 of FIG. 4 and illustrates the anchoring guide means with an attached pipeline anchor;

DESCRIPTION OF THE INVENTION

Figure 7:
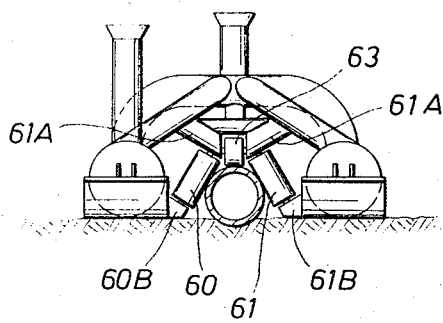
FIG. 7 is an end view of the pipe anchor sled resting on the bottom taken along line 7—7 of FIG. 4 and illustrating the sled in position over the pipeline.

Referring now to FIG. 1, a pipeline 20 has been laid along the floor 21 under a body of water 22. It is desired to anchor the pipeline 20 to the floor 21 by means of individual anchors 23 longitudinally spaced along the pipeline 20. An anchor 23 is constructed of reinforced concrete and has an inverted U-shaped configuration as shown in FIG. 2. For a typical underwater pipeline, the anchor would be 16 feet long, 4 feet wide and 9 feet high.

An anchor is installed on the pipeline 20 by being lowered from a surface work boat 25 to a pipe anchor sled 24 positioned over the pipeline 20. The depth of water may be 100 feet or more where use of a diver to set anchors is not a practical alternative. To lower an anchor 23 from the work boat 25, an anchor 23 is releasably connected to an anchoring guide means 26 on the work boat 25. The guide means 26 is vertically aligned with respect to the sled 24 so that the anchor 23 and anchoring guide means 26 can be lowered through an opening (not shown) in the work boat 25 by means of a hoist cable 31 to the sled 24 which is positioned over the pipe 20. A pair of spaced-apart cables 27 and 28 coupled between the work boat 25 and sled 24 perform a guiding function for the anchoring guide means 26 as it is moved between the sled 24 and the work boat 25. The weight of the anchoring guide means 26 and anchor 23 are such that the depdnding projections or legs of an anchor 23 are driven into the underlying floor surface and fix the pipeline in position relative to the surface floor 21. If desired, a diving bell 29 can be submerged from the boat 25 by means of a crane 30 for observation of the operation. The diving bell 29 is also useful in the initial positioning and location of the sled over the pipeline.

When an anchor 23 is set in position over the pipeline 20 the anchoring guide means 26 is released from the anchor 23 and returned to the work boat 25 by spooling of the hoist cable 31. To move the sled to a new position, the buoyancy of the sled is increased by purging the buoyancy pontoons of water with compressed air delivered from a compressor on the work boat through an umbilical conductor 33 and a series of header pipes and control valves on the sled.

When the sled is thus lightened, a two cable, sled advancement system is used to pull the sled forward along the pipeline to the next position for installation of an anchor. The cable sled advancement system includes sled anchor cables 34 and 35 spooled on winches 36 and 37A on the boat. The cables 34 and 35 are continuous cables which extend forward from the winches 36 and 37A to the port and starboard sides of the surface work boat 25 to remotely located underwater pulleys 39 located to either side of the pipeline of the cables 34. From the pulleys 39, the cables then extend to the pipe anchor sled 24 and are attached thereto. The pulleys 39 are attached to chain anchors 38 by means of heavy chains 37. The location of the anchors 38 can be marked by buoys 32. Only one such anchor is shown in FIGS. 1 and 2 for ease of illustration. The angle of the cables 34 and 35 relative to the pipeline 20 should be fairly acute, say about 20°, and the pulleys 39 should be located far enough in advance of the boat 25 to permit a number of anchors to be set before the chain anchors and pulleys are reset. When the winches 36 and 37A are activated, the tension forces induced in the sled anchor cables 34 and 35 pull the pipe anchor sled 24 forward along the pipeline 20 to a new position on the pipeline.

When the pipe anchor sled 24 is in a new position relative to the pipeline 20, the work boat 25 is moved to a position directly above the pipe anchor sled 24 by appropriate spooling of the barge lines 40(a-d). The barge lines 40(a-d) are anchored to the floor 21 at great distances from the barge. As illustrated, the forward cables 40a and 40b are anchored in similar locations to those of anchors 38. The rearward cables 40c and 40d may be off to the side and rear of the boat and prevent lateral drift of the boat. The winches for the cables 40(a-d) are appropriately operated to move the boat and to maintain tension adequate to control the position of the boat.

Referring now to FIGS. 4 through 6, the pipe anchor sled 24 consists generally of spaced-apart elongated ballast pontoons 42 and 43, which are attached to a supporting framework 44.

The pontoons 42 and 43 define ballast tanks from which water is expelled or admitted in accordance with the buoyancy requirements for the system. The pontoons are adapted to be disposed longitudinally to either side of a pipeline by the supporting frame 44 and the pontoons are typically somewhat larger in diameter than the pipeline. Thus, the supporting frame is generally disposed above the level of the pipeline. Each pontoon has a semispherically shaped forward end 45. A bumper plate 46 is horizontally disposed along the lengthwise axis of a pontoon and around the forward end of a pontoon to provide lateral side bumper surfaces. A curved, flat plate 47 (see FIG. 4) provides a forward curved surface. An upper supporting member 48 provides structural stability for the bumper plate.

At the rearward ends of each pontoon are trailing skid plates 50 which have a flat surface 50a horizontally arranged and disposed rearwardly of the end 51 of a pontoon. The surface of a skid plate is perpendicular to a vertical axis through a pontoon and tangential to the lowermost surface of a pontoon. The plates 50 have a portion 52 thereof which extends coextensively with a pontoon and is curved upwardly until it terminates at a horizontal plane through the center axis of a pontoon. The skid plates 50 are welded or otherwise securely attached to the pontoons.

The supporting framework 44 which is located above the pontoons includes longitudinally extending pipes 55 and 56 which respectively are attached to transverse end pipes 57 and 58 and define a generally rectangular central opening 59 between the pontoons 42 and 43. Interconnecting and supporting pipes 56a and 56b are attached between the pipe 56 and the pontoon 43 along their respective lengths. Interconnecting and supporting pipes 55a and 55b are attached between the pipe 55 and the pontoon 42 along their respective lengths. Similarly, interconnecting and supporting pipes 57a and 57b are attached between the pontoons 42 and 43 at the forward end of the sled and the transverse pipe 57 while interconnecting and supporting pipes 58a and 58b are attached between the pontoons 42 and 43 at the rearward end of the sled and the transverse pipe 58. The purpose of pipes 55 through 58 and their supporting pipes is to provide structural rigidity to the frame.

The sled carries a forward set of rollers 60, 61 and a rearward set of rollers 62a and 62b which facilitate the transfer of the sled from one location to another and the centering and stabilization of the sled for the anchor setting operation. At the forward end of the sled the side rollers 60 and 61 (see FIG. 7) have rotational axes intersecting at a location above the pipeline and equiangularly disposed relative to a vertical plane which would bisect the sled along a longitudinal center axis. The rollers 60 and 61 are journaled on supports 60a and 60b, and 61a and 61b respectively which are attached by supporting members to the frame 44. The rollers 60 and 61 and their locations are sized to support the pontoons 42 and 43 just above the ground level. A top roller 63 with a horizontal rotational axis is mounted in the space between the upper supports 60a and 61a.

At the stern end of the sled (FIG. 5) are vertically journaled rollers 62a and 62b which are mounted on pivotal supporting arm members 64. The arm members 64 are pivoted by hydraulic actuating means 65 between a position where the rollers engage the pipeline and a position where the rollers are retracted, as illustrated in FIG. 5. Along a vertical axis which is perpendicular to the longitudinal axis of a pontoon are upper and lower sets of pivot blocks 66 and 67 which are attached to the stern end of a pontoon 43 (see FIGS. 4 and 5). The pivot blocks 66 and 67 pivotally support upper and lower support members 68 and 69. The rollers 62a and 62b are pivotally journaled to the outer ends of the support members 68 and 69. Intermediate of the span between the upper and lower support members 68 and 69 are a set of pivot blocks 70 located at the inner side of a pontoon. Intermediate of the length of the support members is a pivotally mounted vertical support bar 71 (see FIG. 4). The piston rod 72 of a hydraulic actuating mechanism is pivotally connected to one of the pivot blocks 70 while the cylinder 73 is connected to a vertical support bar 71. The hydraulic actuating mechanism serves to move the rollers 62a and 62b between the retracted position illustrated in FIG. 5 and a position in engagement with a pipeline.

When an anchor has been set and it is necessary to move the sled along the axis of the pipeline to a new position, the rollers 62a and 62b are pivoted to their retracted positions so that as the sled is pulled forward along the pipeline, an anchor 23 will freely pass through the stern of the sled with no interference from the retracted rollers. After passing over an anchor and when the sled is in its new position along the pipeline, the rollers are hydraulically activated to pivot and contact the pipeline, centering and stabilizing the sled on the pipeline for the anchor setting operation.

Attached to the front and rear transverse end pipes 57 and 58 are upstanding guide posts 75 and 76 which are vertical tubular members having flared upper ends through which the guide cables 27 and 28 pass. Each upper portion of the guide posts 75 and 76 has a vertically extending notch in a facing relationship so that as the anchoring guide means 26 is lowered to the sled 24, the guide bushings 78 and 79 will align in the vertical notches of the guide posts and be stabilized with respect to the sled and properly positioned over the pipeline 20.

The anchor guide cables 27 and 28 pass through the upstanding guide posts 75 and 76 and are attached to brackets (not shown) mounted on the transverse end pipes 57 and 58 of the sled. The guide cables 27 and 28 provide a guiding function for the anchoring guide means 26 as the guide means is lowered from the work boat to the sled. At their upper ends the guide cables are attached to tensioning devices (see FIG. 9) on the work boat which enable the guide cables to remain taut when the work boat moves under the influence of waves during the anchor setting operation.

As shown in FIG. 6, a pipeline anchor 23 has a horizontal upper section 80 and vertical, outwardly diverging sections 81 and 82 all having uniform cross-sectional areas. Two downward projecting flange sections 83 and 84 are attached to the vertical sections 81 and 82 and are tapered toward the ends to facilitate penetration of the floor 21.

The anchoring guide means 26 consists of a longitudinal beam member 85 (FIGS. 4 and 6) which has guide bushings 78 and 79 at its ends with vertical openings to receive the guide cables 27 and 28. Intermediate of the beam 85 and near each end thereof are pairs 86, 87 and 88 of depending, outwardly diverging support members which are arranged in the form of an inverted V to contact the anchor on the outwardly diverging sections 81 and 82 of the anchor. A horizontal support member 89 extends between a pair of support members and engages the upper section 80 of an anchor. The horizontal support member 89 between the pair of vertical support members provides structural rigidity for the anchoring guide means. Also, anchor release means 90, which will be discussed in greater detail later, are on the horizontal member 89 and cooperate with couplings on an anchor for releasably interconnecting the anchor and anchoring guide means. The hoist cable 31 is connected at one end to the beam 85 of the anchoring guide means 26 and is spooled on the hoist winch (FIG. 9) on the deck of the work boat. When the hoist cable 31 is actuated, the anchoring guide means 26 can be lowered or raised between the work boat and the sled.

Mounted on the starboard pontoon of the sled is a J-tube connecting means 92 for the surface to sled umbilical conductor 33 which allows the umbilical conductor 33 to be positively connected to the sled. The umbilical conductor 33 includes electrical power and piping conduits for connecting an air compressor (not shown) and control means on the work boat to the sled. While not illustrated, the pontoons can be compartmentalized and selectively coupled to the air or water intakes for selective ballasting of the sled.

Figure 8:
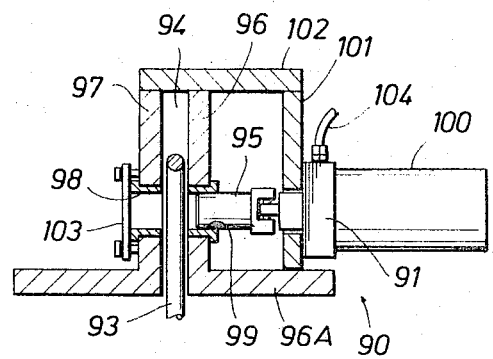
FIG. 8 is a detailed illustration of an anchor release device for releasably coupling a pipeline anchor to the anchoring guide means.

Referring now to FIG. 8, the anchor release means 90 includes a hydraulically operated mechanism which permits the anchor 23 to be positively coupled to the anchoring guide means 26. On the horizontal upper section 80 of an anchor 23 is an upstanding eye or loop member 93 which is received in a recess 94 in an anchor release means 90. A horizontally shiftable pin member 95 is insertable through the opening of the loop member 93. The anchor release means 90 are connected to the horizontal supporting members 89 of the anchoring guide means 26. An anchor release means 90 includes a base plate 96a with spaced-apart vertical members 96 and 97 which define the recess 94 for the loop member 93. The vertical members 96 and 97 have aligned openings 98 and 99 in bushings which slidably receive the pin member 95. The pin member 95 is an extension from a hydraulic actuating mechanism 100 which is attached to another vertical frame member 101. A top plate member 102 provides structural rigidity for the vertical members 96, 97 and 101 of the anchor release means. When it is desired to couple an anchor to the anchoring guide means, the pin 95 is withdrawn to the position shown in FIG. 8 and the guide means is then positioned above an anchor such that the loop member 93, which is on the horizontal upper section 80 of the anchor, is situated in the recess 94 between members 96 and 97. The hydraulic cylinder 100 is then actuated and pushes the pin 95 forward and through the opening in the loop member 93. A retainer plate 103 prevents the bushing from sliding in and out of the plate member 97. The positively coupled anchoring guide means and anchor then may be lowered from the work boat to the pipeline and the anchor emplaced on the pipeline. With the anchor lowered to the pipeline and in place anchoring the pipeline to the floor 21, the hydraulic cylinder 100 is actuated by means of a hydraulic line 104 which is connected to the mounting flange 91 of the anchor release means and to a hydraulic operator (not shown) on the work boat. The actuation of the hydraulic cylinder 100 retracts the pin 95 from its extended position to the position shown in FIG. 8 such that the anchor is no longer coupled with the anchoring guide means which may then be hoisted to the work boat by spooling of the hoist cable 31.

Figure 9:
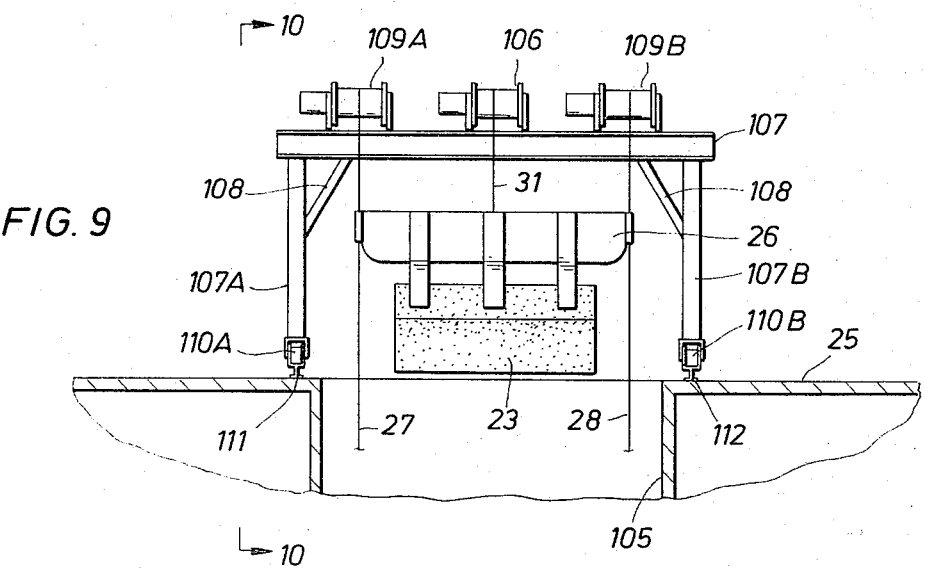
FIG. 9 is a side view of an anchor lowering frame on the deck of the work boat from which, by means of winches mounted on the top of the frame, the pipeline anchor and anchoring guide means may be lowered through the deck of the work boat to the submerged pipeline.
Figure 10:
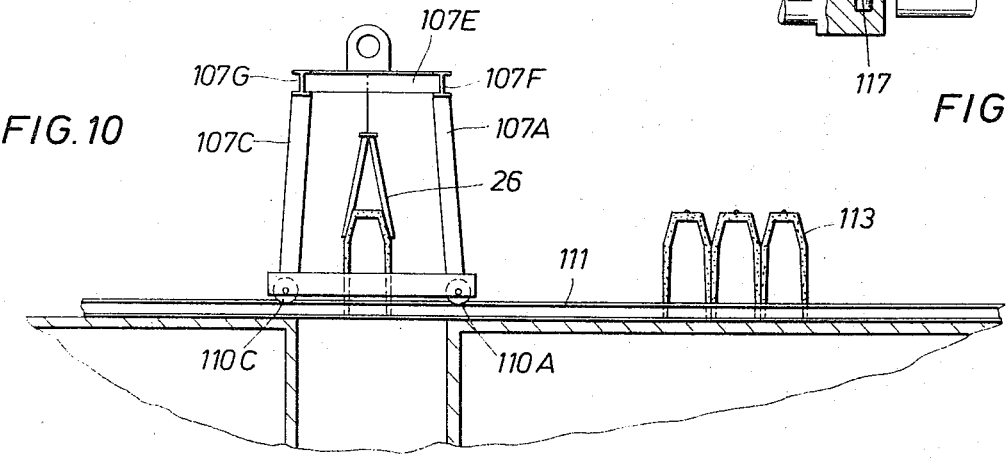
FIG. 10 is an end view of the anchor lowering frame on the deck of the work boat taken along line 10—10 of FIG. 9 and illustrating an anchor in position to be lowered through the deck of the work boat and illustrating additional anchors stored on the deck of the work boat.

Referring now to FIGS. 9 and 10, the anchor guiding means 26 with an anchor 23 attached in position to be lowered through the opening 105 in the deck of the work boat 25 is illustrated. The anchoring guide means 26, and anchor 23 are supported by means of a hoisting winch 106 on which is spooled the hoist cable 31, mounted on the top of the anchor lowering frame 107. Not shown is the hose connection for the hydraulic actuating means 100.

The anchor lowering frame 107 is composed of four upright structural members 107(a–d) one of which is not shown, a number of horizontal members 107(e–g) (some of which are not shown) and brace members 108 which provide structural rigidity to the frame. Also shown in FIG. 10 are the guide cables 27 and 28 which are spooled on the hydraulic guide winches 109a and 109b giving constant tension. The anchor lowering frame 107 is mounted on four wheels 110(a-d), one of which is not shown, on tracks 111 and 112 which allows the frame to be rolled along the tracks to pick up spare anchors 113 on the deck of the work boat and to return the anchor lowering frame 107 to a position above the opening 105 in the deck of the work boat.

DESCRIPTION OF THE OPERATION

As the pipeline 20 is laid along the floor 21 of the body of water 22, it is premarked at specified intervals along its length with marking buoys 32a. The locations of the buoys, based upon the nature of the body of water and the bottom composition, indicate the positions along the length of the pipeline at which it is desired to place pipeline anchors. The work boat 25 is moved into a position marked by the first buoy and four stabilizing boat anchors are extended and set laterally from the work boat to provide positive positioning above the pipeline and stabilization for the work boat relative to the influence of waves and currents during the anchor setting operation. The two cable anchors with the sled anchor cables 34 and 35 attached are then set forward of the work boat to port and starboard of the pipeline and will provide the means by which the sled may be moved forward along the pipeline.

The sled 24, which is coupled to the guide cables 27 and 28 and to the two sled anchor cables 34 and 35, is ballasted with water from topside and lowered to the submerged pipeline 20 by unspooling of the guide cables from the guide cable winches 109a and 109b. The sled 24 is lowered until it contacts the pipeline 20 and is then centered on the pipeline by maneuvering the work boat cables 40(a-d) such that the work boat is directly above the pipeline. The maneuvering may be facilitated by lowering the diving bell 29, which can carry a tv system and sensing devices to make a visual inspection of the sled positioning on the pipeline. With the sled 24 generally centered on the pipeline, the biased stern rollers 62a and 62b are hydraulically actuated to pivot from their retracted positions and contact the pipeline thereby centering the stern of the sled on the pipeline and stabilizing the sled for the anchor setting operation.

Figure 11:
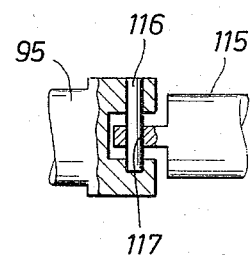
FIG. 11 is an enlarged view of the interconnecting means for releasable coupling of FIG. 8.

The anchoring guide means 26 is now coupled to the guide cables 27 and 28 and the hoist cable 31 from the hoist winch connected to the guide beam. An anchor 23 is positioned between the crane rails 111 and 112 in close proximity to the opening in the barge and the lowering frame 107 is moved along the crane rails until the anchoring guide means 26 is positioned directly above an anchor. This operation requires slackening the guide cables, which are attached to the submerged sled, so that the sled is not inadvertently pulled from the pipeline. An anchor is coupled with the anchoring guide means 26 by actuating the hydraulic cylinder 100 of the anchor release which pushes the pin 95 forward and through the openings of the eye members 93 on the anchor. The coupled anchoring guide means and anchor are hoisted by spooling of the hoist cable 31 onto the hoist winch and the frame may then be easily rolled along the crane rails to a position above the opening in the work boat. With the guide rails 27 and 28 tautened by spooling of the guide cables on the guide winches, the anchor and guide means are lowered by unspooling of the hoist cable 31 from the hoist winch. The tension on cables 27 and 28 is maintained constant by a conventional constant tensioning device (not shown). The guide means and anchor are lowered through the body of water to the sled 24, the guide cables keeping the guide means and anchor in alignment with the sled and pipeline. As the anchor reaches the pipeline, the projecting flanges 83 and 84 of the anchor are embedded in the floor. Should the weight of the anchor and guide means prove insufficient to embed the anchor, an additional booster weight may be lowered from the work boat via the hoist cable to force the anchor flanges to penetrate the bottom. With the anchor sufficiently buried, the anchoring guide means 26 is uncoupled from the anchor by actuating the hydraulic cylinders 100 of the anchor release means. As shown in FIG. 11, the cylinders 100 have pistons 115 with a tang slidably mounted with respect to a pin 116 on the pin member 95. The bore 117 is slidable with respect to the pin 116 so that the pin member 95 does not bind in the bushings and thus permits release of the pin members 95 from the eyelet 93. Withdrawing the pins 95 from the eye members of the anchor releases the anchor 23 from the anchoring guide means 26. The anchoring guide means then can be hoisted to the work boat and the work boat then can be moved along the pipeline to a position indicated by the second marking buoy 32a. To increase the buoyancy of the sled 24 and thereby facilitate movement of the sled along the pipeline, the buoyancy pontoons of the sled are deballasted of water by compressed air delivered to the pontoons through the umbilical conductor 33. The sled is "lightened" by deballasting to a point where it becomes nearly neutrally buoyant but still possesses some negative buoyancy so that it "lightly" rests in contact with the pipe.

The rollers 62a and 63b at the stern of the sled are hydraulically activated to the retracted position so that as the sled is initially moved forward along the pipeline, the anchor that has just been set will pass through the sled without interference from the stern rollers. After the sled is free of the anchor, the stern rollers are reset in contact with the pipe.

With the lateral anchors from the work boat taut, the anchor cables 34 and 35 are spooled onto the anchor cable winches on the work boat and the tension forces thus induced in the anchor cables pull the sled forward along the pipeline. The sled may be constantly "trimmed" by appropriate ballasting and, if desired differential ballasting can be effected between the front and the rear of the sled so that the forward end of the sled is slightly elevated with respect to the rearward end. The purpose of "trimming" is to insure a smooth transit over the sea floor without driving the sled into the sea floor. The sled is moved forward approximately forty feet and the lateral cables 40(a-d) of the work boat are adjusted such that the work boat is situated above the sled. This process is continued in 40 foot increments or other suitable increments of distance until the sled and work boat are in a position indicated by the second marking buoy 32a.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A system for anchoring an underwater pipeline at intervals along its length where the pipeline extends along a floor under a body of water, comprising:

anchoring sled means which are submergible in water, said sled means being constructed and arranged to straddle an underwater pipeline, surface boat means adaptable for vertical alignment with respect to said submergible anchoring sled means;

pulley anchor means for location along the pipeline at a relatively great distance from said boat means, pulley means coupled to said pulley anchor means;

cable means extending from said boat means, over said pulley means and coupled to said anchoring sled means for selectively moving said anchoring sled means along a pipeline from one position to another position;

vertically disposed cable guide means extending between said boat means and said anchoring sled means;

anchor means having an inverted U-shaped configuration;

anchor placement means slidably coupled to said cable guide means for lowering an anchor means from said boat to said anchoring sled means, said anchor placement means including means for releasably coupling said placement means to said anchor means.

2. A system for anchoring an underwater pipeline as defined in claim 1 and further including means for selectively altering the buoyancy of said anchoring sled means underwater between a first buoyancy condition retaining said sled means in position for location of an anchor means on a pipeline and a second lighter buoyancy condition for permitting movement of said sled means along said pipeline to another position.

3. A system for anchoring an underwater pipeline as defined in claim 2 wherein said means for altering buoyancy underwater includes elongated tank members each having longitudinal axes arranged for disposal to either side of a longitudinal axis of a pipeline, and conduit means extending between said surface means and said tank members.

4. A system for anchoring an underwater pipeline as defined in claim 3 wherein said tank members have forward and rearward rollers for engagement with a pipeline, and means for selectively moving said rearward rollers toward and away from a pipeline.

5. A system for anchoring an underwater pipeline as defined in claim 4 and further including forward and rearward plate members attached to the lowermost side of said tank members for providing flat sliding surfaces.

6. A method for anchoring an underwater pipeline with underwater anchors at spaced-apart underwater locations comprising the steps of:

positioning a work boat above an underwater location where an anchor is desired for a pipeline;

positioning an anchoring sled means over the pipeline at said underwater location in relative vertical alignment with respect to said work boat;

mechanically guiding an inverted U-shaped anchor between said work boat and said anchoring sled means and applying be weight to said anchor for installing said anchor over said pipeline;

pulling said anchoring sled means along said pipeline to the next underwater location for installation of another anchor where the pipeline serves as a guide track for said anchoring sled means.

7. The method of claim 6 and further including the steps of increasing the buoyancy of said anchoring sled means after an anchor is set for facilitating travel to the next location and decreasing the buoyancy of said anchoring sled means prior to the setting of an anchor for facilitating the guiding of an anchor to said anchoring sled means.

8. The method of claim 7 and further including in the step of pulling said anchoring sled means, the application of a pulling force on the work boat and the location of underwater pulley means along said pipeline forwardly of said anchoring sled means so that a cable connection between the boat and anchoring sled means can apply the pulling force to the anchoring sled means.

9. An anchoring sled means for an underwater pipeline anchoring system comprising:

tank members elongated along longitudinal axes, frame means coupling said tank members to one another for permitting said tank members to straddle an underwater pipeline, said frame means defining a rectangular opening through which an anchor can be passed, guide means disposed along vertical axes which are perpendicular to a longitudinal axis disposed intermediate of said tank members, said guide means having a longitudinal guiding function, said guide means being adapted for receiving cable guide means, buoyancy control means for coupling to a surface boat, said buoyancy control means being coupled to said tank members and providing floatation control, anchor placement means sized to be lesser in cross-section than said rectangular opening and having vertically arranged guide members disposed along axes which are perpendicular to a longitudinal axis disposed intermediate of the width of said anchor placement means, said guide members being cooperatively receivable by said guide means for positioning said anchor placement means relative to said rectangular opening and said guide members being adapted for sliding along a cable guide means.

10. The anchoring sled means of claim 9 and further including means disposed along said longitudinal axis intermediate of the width of said anchor placement means for releasably engaging an anchor.

11. An anchoring sled means for an underwater pipeline anchoring system comprising:

spaced apart, elongated hollow tank means for ballast and buoyancy positioning under water, frame means connecting said tank members in a parallel relationship and a spacing adequate for straddling an underwater pipeline, said frame means being arranged to define an elongated rectangular opening through which an anchor can be passed, vertical guide means on said frame means and located at either end of said rectangular opening along a central longitudinal axis for said opening, said vertical guide means including means for receiving surface cable means and for defining a vertical guiding function whereby an anchor can be vertically guided along cable means and positioned by the vertical guiding function of said upright guide members, and buoyancy control means for providing floatation control of said tank means.

12. The anchoring sled means of claim 11 and further including first and second sets of wheel means attached to said frame and tank means respectively at locations forwardly and rearwardly of said rectangular opening, said wheel means being disposed to engage the sides of a pipeline to either side of a vertical plane and engageable with a pipeline for rolling support of said sled means along a pipeline, said wheels being arranged for contact with a pipeline only in upper half of a pipeline whereby the pressure of the wheels on a pipeline can be controlled by the degree of buoyancy of said sled means.

13. The anchoring sled means as defined in claim 12 and further including selectively operable means for mounting said rearward set of wheel means for movement between position of engagement and a position of disengagement with a pipeline.

* * * * *